Figure 1:
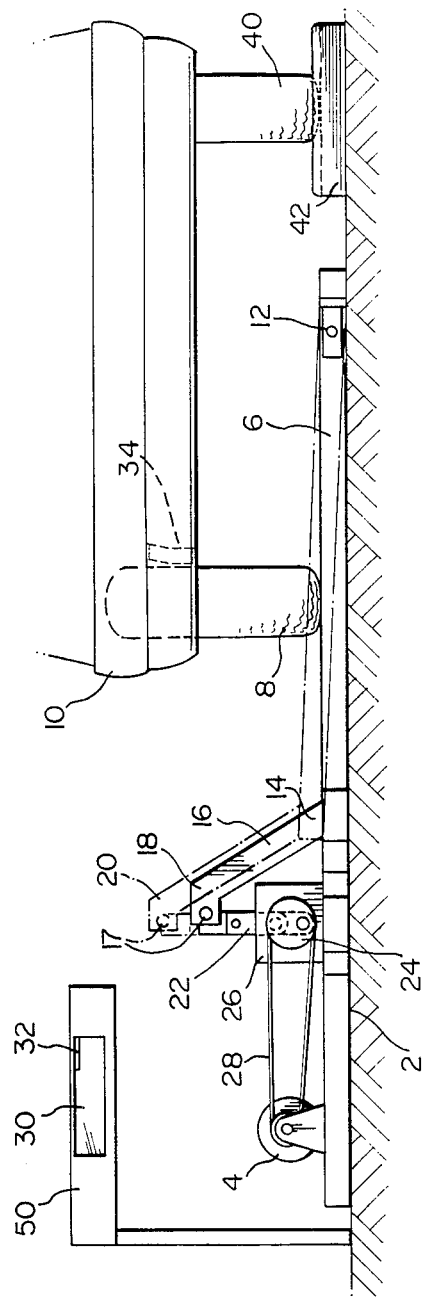

United States Patent [19]

Westall

[11] Patent Number: 4,774,829
[45] Date of Patent: Oct. 4, 1988

[54] SHOCK ABSORBER TESTING MACHINE

[76] Inventor: Peter Westall, 1989 Neepawa Avenue, Ottawa, Ontario, Canada, K2A 3L4

[21] Appl. No.: 48,146

[22] Filed: May 11, 1987

[30] Foreign Application Priority Data

Mar. 4, 1987 [CA] Canada .................................. 531098

[51] Int. Cl.[4] .......................................... G01M 17/04
[52] U.S. Cl. ........................................... 73/11; 73/669
[58] Field of Search ..................................... 73/11, 669

[56] References Cited

U.S. PATENT DOCUMENTS 2,799,158  7/1957  Federspiel ........................ 73/11 X
2,934,940  5/1960  Beissbarth ............................. 73/11
3,690,145  9/1972  Brisard .................................. 73/11

Primary Examiner—Charles A. Ruehl
Attorney, Agent, or Firm—R. William Wray & Associates

[57] ABSTRACT

An apparatus and method for testing a shock absorber system when in place in a vehicle's wheel suspension assembly includes a plate member which is moved up and down to cause a wheel of a vehicle thereon to move up and down. The plate member is moved by operation of a motor to permit visible and audible examination. The test is continued beyond the point at which an inefficient shock absorber would exhibit visible and audible wheel bounce and rotation.

3 Claims, 2 Drawing Sheets

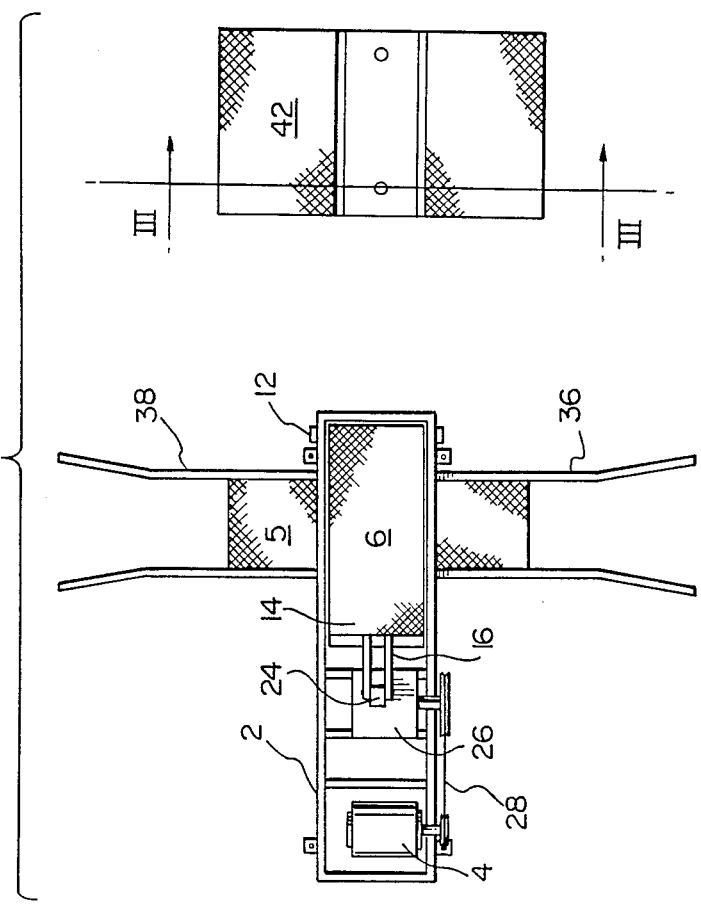

SHOCK ABSORBER TESTING MACHINE

This invention relates to apparatus for testing shock absorber systems in vehicles.

Previous apparatus for testing shock absorber systems in vehicles have usually necessitated pushing down on the body of the vehicle by hand above a respective wheel and visually observing the bouncing motion. The resulting oscillations are often counted visually or by an oscillation measuring device attached to the vehicle. Details of other apparatus indicates that reliance is placed on the vehicle's wheel or wheels being oscillated vertically in this manner and where the pressure or movement between plate and wheel or vehicle body movement are measured electronically or mechanically.

Experience with previous systems indicates that they are good at measuring shock absorber movement relative to applied force. However, the results may be inaccurate and inconclusive in that they do not accurately take into account the combined effect of vehicle weight, suspension geometry and shock absorber characteristics as they relate to the efficiency of the shock absorber in maintaining the vehicle's wheel in contact with the road surface having regard to the road bumps which the vehicle normally encounters.

It is an object of the present invention to provide for testing shock absorber systems in vehicles which more accurately simulates road conditions as experienced by a moving vehicle.

Accordingly, from one aspect the present invention provides apparatus for testing a shock absorber system when in place in a vehicle's wheel suspension assembly comprising a first means for supporting a wheel whilst on the vehicle, second means for causing said first means to oscillate in a vertical direction at a selected speed in a controlled manner to permit visual and audible examination of the shock absorber system to determine that point at which a malfunctioning shock absorber is unable to control the wheel bounce.

From another aspect the present invention provides a method of testing a vehicle's shock absorber system when in place in the vehicle's wheel suspension assembly comprising the steps of positioning and maintaining the respective wheel, associated with the shock absorber system under test, on a plate member having one end pivotally attached to a stationary base member, moving the freely moveable other end of said plate member in a substantially vertical up and down movement, and visibly and audibly examining said movement.

In one embodiment there is provided apparatus for testing a vehicle's shock absorber system when in place in the vehicle's wheel suspension assembly comprising a plate member having one end pivotally attached to a stationary base member and the other end freely moveable in a substantially vertical direction in an up and down movement whereby when the wheel of the vehicle under test is driven on to said base member it can be moved vertically, a locating plate arrangement spaced from said pivoted one end of said plate member away from said other end, said locating plate arrangement being capable of accepting and holding the wheel of the vehicle opposite to the wheel associated with the shock absorber system under test so as to prevent the vehicle moving off said plate member, one end of a plate extension arm connected to said other end of said plate member, a crank case unit connecting rod attached to the other end of said plate extension arm, a motor connected to said crank case unit whereby operation of said motor is effective to cause said wheel associated with the shock absorber system under test to move up and down in a substantially vertical movement.

An embodiment of the present invention will now be described, by way of example, with reference to the accompanying drawings in which:

FIG. 1 is a diagrammatic side view of part of the apparatus for testing shock absorber systems in vehicles, FIG. 2 is a diagrammatic plan view of the apparatus for testing shock absorber systems in vehicles, and FIG. 3 is a diagrammatic cross-sectional view of a wheel guide locating plate of FIG. 2 taken on the line III—III.

Referring to the figures, the apparatus comprises a heavy duty fabricated or cast metal base frame member 2 bolted to the floor of the test site. An electric motor 4 comprising the motive power is mounted on the base member 2.

A heavy duty oscillating plate member 6, for supporting wheel 8 of a vehicle 10, is pivotally mounted at one end to the base member 2 by way of a pivot bearing assembly 12. The other end 14 of plate member 6 is capable of up and down movement under control of a plate extension arm 16 connected to said other end 14 through a suitable bearing arrangement 17. The upper end of arm 16 is moveable between a lower position 18 and an upper position 20 and, for this purpose, a substantially vertical connecting rod 22 is connected to it. The lower end of rod 22 is connected to a crank unit 24 in a crank case 26 which also houses the crank bearings and a lubrication oil bath. The crank unit 24 is driven by way of a drive connection 28 from motor 4 to provide a controlled oscillating plate movement. The drive connection 28, in this embodiment, consists of a toothed high torque drive belt and pulley arrangement so as to reduce or substantially avoid adjustment maintenance and yet ensures an accurate drive ratio with non-slip performance with the desired oscillating plate movement. The drive belt and pulley arrangement transmit the motive power to fulfill the torque and speed requirements of the test cycle.

The apparatus also includes a speed control and electronic control circuitry in a control unit 30 and a digital display 32. This may, if desired, be a linear display and indicates that oscillating speed at which the shock absorber unit 34 in vehicle 10 fails to control the wheel and suspension movement and begins to allow the wheel to bounce and rotate as it loses contact with the oscillating plate 6. The speed control may be digital.

As will be understood, the apparatus provides for a controlled minimum oscillating speed of the plate or platform 6 to enable the shock absorbers to reach a regular working temperature so as to ensure consistent results.

Guide ramps 36 and 38 are provided to ensure that wheel 8 is correctly located on the oscillating plate 6. The opposite wheel 40 is held on a locating plate arrangement 42 to ensure correct centering of the test wheel 8 as well as correct positioning relative to the pivot point 12, and to avoid movement of vehicle 10. The vertical oscillation distance is consistent for all tests and the plate 42 is of sufficient width to cater for small and large vehicles in a test procedure. It is shown in slightly greater detail in FIG. 3.

It will be appreciated that there is some hazard in wheel-bouncing and this is safe-guarded against by the static wheel locating plate arrangement 42 which is so positioned as to accept the opposite wheel 40 so as to prevent the vehicle 10 moving off the oscillating plate 6 whilst the vehicle is under test. The vehicle 10 whilst under test has its brakes in an off position and it is in neutral gear so as to ensure total free movement of the vehicle's suspension system including the shock absorbers 34. The wheel locating slot in the wheel locating arrangement should have a sufficient depth and width to ensure that the driver of the vehicle 10 to be tested is made aware of the correct positioning of the wheel 40 in the slot of locating plate 42 and, in consequence, the correct positioning of the wheel 8 on the oscillating plate member 6. The guide ramps, such as 36 and 38, automatically guide the wheel 8, with the shock absorber system to be tested, to its correct position on the plate member 6. The oscillation test can then be performed satisfactorily.

The guide ramps are constructed of rounded material to avoid tire damage and are attached to tire ramps to provide easy driving on to the oscillating plate member 6.

As will be appreciated, the electric motor 4 is designed to provide sufficient torque to start the apparatus and to provide the necessary acceleration throughout the test cycle. As will also be appreciated instead of motor 4, power could be provided, for example, by an internal combustion engine, a hydraulic motor or an air motor.

The electronic control circuitry 30 may be commercially available units to provide variable power output to the electric motor 4. A typical unit is a Reliance Electric VS Drive Model 1AC2105 which has been found to provide the necessary starting torque and frequency/voltage ratio variation to operate the apparatus during a test cycle. A removable facricated cover 50 is provided for the electronic control circuitry 30 and associated master power supply switch. Cover 50 is ventilated to promote cooling and is provided with appropriate inspection panels. It is independently floor mounted for insulation against operating vibrations from the oscillating mechanism.

In use the apparatus causes the plate member 6 to move in a vertical oscillation fashion with a variable speed motion, for example in a sine wave motion, which simulates road bumps typical of those encountered under driving conditions where it is known and can be demonstrated that vehicles with a defective shock absorber allow the wheel to bounce uncontrollably. Visible and audible wheel bounce and wheel rotation with the apparatus during testing identifies the condition in which a malfunctioning, inefficient, shock absorber is unable to control the compression and rebound of the suspension and the resulting wheel bounce. It has been found that efficient shock absorbers having an approved specification do not experience this pronounced wheel bounce and wheel rotation until beyond a certain range of oscillation speeds.

By visual and audible examination an operator can determine the main characteristics of a shock absorber unit 34 and/or suspension system. If they are not of the standard required then repair or replacement can be effected.

It will be seen that in the described embodiment no special devices are required or need be attached to the vehicle, nor do the results require specialised interpretation or comparison against predetermined specified standards. The working temperature of the shock absorber is attained during the test oscillating cycle and the results of the test are dramatically demonstrated to the satisfaction of the uninitiated.

Once the wheel 8 is properly positioned, the control circuitry 30 within a control unit is caused to control the motor 4 so as to supply variable power to the motor crank unit 24. The oscillating plate member 6 is first caused to move at a minimum oscillating speed. This permits examination of the suspension mechanism, including the shock absorbers, and allows the shock absorbers to warm up to an operating temperature. The oscillating speed of plate member 6 is then gradually increased using the control unit 30 from a minimum speed setting to a higher speed setting at which visible and audible wheel bounce and wheel rotation is induced. If the shock absorbers are not operating effectively this will be below a required pre-set higher setting. During the testing procedure, this point of wheel bounce and rotation is noted on a digital speed control portion of control unit 30. This gives an indication of the efficiency of the shock absorber unit 34 in relation to the required minimum higher speed setting which an efficient shock absorber unit must reach before showing visible and audible bounce. Faulty shock absorbers will fail this test at digital readings below said required minimum higher setting.

After completion of the test, the speed control of control unit 30 is returned to the "off" position which results in slowly stopping the movement of the oscillating plate member 6. The speed control can provide manually variable controlled speeds from a minimum speed through a pre-set speed range.

As will be appreciated some of the prior art machines require special electronic or other measuring devices to be incorporated into the design to measure test results, require measuring devices to be attached to the vehicle or produce graphed or metered results which require interpretation by experienced specially trained staff. Some prior machines also require standard comparative criteria for all manner of different vehicles and different shock absorber options but do not conduct the testing at the working temperature for which the shock absorber was designed, nor do they provide diagnostic results which can readily be interpreted by the uninitiated. They frequently require expensive below ground installation and do not provide the facility for varying the simulated road bump oscillations over the working range of the shock absorber. Furthermore, they do not demonstrate conclusively that with a bad shock absorber the wheel bounces on a rough road surface.

In the previously described embodiment, the apparatus may be successfully operated by inexperienced personnel who require no training or special knowledge other than to identify rotational wheel movement and wheel bounce within the pre-set oscillation speed limitations of the apparatus. The plate 6 must oscillate over a minimum distance to avoid forcing the shock absorber unit against its natural movement, and said oscillating distance must, in the described embodiment, be sufficient only to initiate natural movement of the shock absorber as would be encountered on a typical bumpy road surface.

It will be understood that using the apparatus described in the embodiment, no excavation below ground level is required and neither need a false floor be built. The complete apparatus including the oscillating plate member 6 and the locating plate 42 are affixed to the floor or a transportable base above the floor without excavation. The apparatus varies and controls the oscillating vertical (up and down) speed of the plate member 6 to simulate the bumps of a road surface at varying speed to the maximum encountered under normal driving conditions.

In one constructed embodiment tests showed that if the oscillation speed of plate 6 was gradually increased then a vehicle's shock absorber system could usually be caused to exhibit wheel bounce and rotation. Eventually, the wheel could bounce off the plate. However, it was found that with efficient shock absorbers the particular speed of bounce was always higher than for an inefficient shock absorber. The actual speed depended on a number of factors including the weight of the car, the wear in the springs, whether the gas tank is full, etc. By selecting a range of oscillation speed between 350–700 oscillations per minute and subjecting all vehicles to this range starting at the lower number, it was found that a reliable indication of the quality of the shock absorber system could be obtained. Somewhere within that range, an inefficient shock absorber always exhibited visible and audible wheel bounce, with the wheel not maintaining constant contact with plate 6.

On some cars the bouncing resulted in a space of up to 3 inches between the wheel and plate 6 for inefficient shock absorbers. Inefficient shock absorbers resulted in a definite hammer sound at the upper end of the oscillating range. For different vehicles the point of bounce was not the same but the range of 350–700 oscillations per minute was found to be sufficient to test all vehicles during the experimental development stage. Even when a system didn't give too loud an audible indication, it tended to rotate and this could be visibly seen. The amplitude of oscillation was maintained constant; This is not essential in all cases.

It will be seen that there has been described apparatus for testing shock absorbers and suspension systems in place in the wheel suspension assemblies of vehicles consisting of a hinged support plate housed in a supporting framework containing a variable speed control and power drive mechanism and driven crank which actuates the hinged plate in a vertical movement, said plate being hinged at right angles to the wheel to be tested and moved directly against the wheel by the crank to simulate the typical surface of a bumpy road when the wheel moves over such a road, the movement of the plate against the wheel being such as to cause the wheel attached to the faulty shock absorber to bounce off the plate and rotate and cause faulty suspension mechanisms to move in planes contrary to their design function, such movement readily being identified by visual and audible inspection.

The described method of testing shock absorbers and suspension mechanisms includesthe steps of (a) positioning of the wheel and shock absorber and suspension to be tested to the correct position on the stationary hinged plate using the guide ramps and the floor mounted locating plate used to locate the wheel opposite to the wheel to be tested, such position being terminated with the brakes in the "off" position and the transmission in a non-drive position, (b) following operation (a) above the control unit which supplies variable power to the motor crank and oscillating mechanism is switched on to the minimum oscillating speed to allow examination of the suspension mechanism and to allow the shock absorbers to warm to an operating temperature. The oscillating plate speed is then manually and gradually increased using the control unit through a minimum to a pre-set maximum speed range which induces visible and audible wheel bounce and wheel rotation if the shock absorbers are not operating effectively, (c) during the testing procedure (b) above, the point of wheel bounce and rotation is noted on the digital speed control which indicates the relative efficiency of the shock absorber to the pre-set maximum specified on the digital display of the apparatus, being the minimum point at which efficient shock absorbers will not show visible and audible bounce and wheel rotation. Faulty shock absorbers will fail this test at digital readings below the maximum setting, (d) following completion of test (c) above the control unit is returned to the "off" position resulting in slowly stopping the movement of the of the oscillating plate.

Whilst the embodiment describes a plate member 6, the plate member 6 may be replaced by a suitable support means, for example an oscillating supporting cradle may be used.

It will be readily apparent to a person skilled in the art that a number of variations and modifications can be made without departing from the true spirit of the invention which will now be pointed out in the appended claims.

I claim:

1. Apparatus for testing a shock absorber system when in place in a vehicle's wheel suspension assembly comprising:
   (a) a first means for supporting a wheel whilst on the vehicle, said first means comprising a plate member having one end pivotally attached to a stationary base member and the other end freely moveable in substantially vertical direction in an up and down movement whereby when the wheel of the vehicle under test is driven on to said plate member the wheel can be moved vertically,
   (b) a locating plate arrangment is provided spaced from said pivoted one end of said plate member away from said other end, said locating plate arrangement being capable of accepting and holding the wheel of the vehicle opposite to the wheel associated with the shock absorber system under test so as to prevent the vehicle moving off said plate member,
   (c) second means for causing said first means to oscillate in a vertical direction at a selected speed in a controlled manner to permit visual and audible examination of the shock absorber system, said speed being beyond that speed at which a malfunctioning shock absorber is unable to control the wheel bounce,
   (d) said second means comprising one end of a plate extension arm connected to said other end of said plate member, a crank case unit connecting rod attached to the other end of said plate extension arm, and an electric motor connected to said crank case unit whereby operation of said motor is effective to cause said wheel associated with the shock absorber system under test to move in a substantially vertical oscillating fashion with a variable speed motion and,
   (e) including a control unit to control said electric motor so as to cause said plate member to move initially at a first oscillating speed whereby the shock absorber system under test warm up to an operating temperature, said control unit then being utilised to gradually increase the oscillating speed of said plate member to a point beyond which visible and audible wheel bounce and rotation would be induced in an inefficient shock absorber, said point being indicative of the efficiency of said shock absorber unit.

2. Apparatus according to claim 1 wherein said point is indicated on a digital speed control portion of said control unit.

3. A method of testing a vehicle's shock absorber system when in place in the vehicle's wheel suspension assembly comprising the steps of:

(a) positioning and maintaining the respective wheel, associated with the shock absorber system under test, on a plate member having one end pivotally attached to a stationary base member, (b) moving the freely moveable other end of said plate member in a substantially vertical up and down movement by moving said plate member initially at a first oscillating speed whereby the shock absorber system under test warms up to an operating temperature, then gradually increasing said oscillating speed to a point beyond which visible and audible wheel bounce and rotation would be induced in an inefficient shock absorber, and (c) visibly and audibly examining said movement by comparing the speed at said point to the speed at which an efficient shock system would reach before showing visible and audible wheel bounce so as to provide an indication of the efficiency of the shock absorber system under test.

* * * * *